US011320998B2

(12) United States Patent
Yu et al.

(10) Patent No.: US 11,320,998 B2
(45) Date of Patent: May 3, 2022

(54) METHOD FOR ASSURING QUALITY OF SERVICE IN DISTRIBUTED STORAGE SYSTEM, CONTROL NODE, AND SYSTEM

(71) Applicants: Huawei Technologies Co., Ltd., Shenzhen (CN); WILLIAM MARSH RICE UNIVERSITY, Houston, TX (US)

(72) Inventors: Si Yu, Hangzhou (CN); Junhui Gong, Hangzhou (CN); Peter Varman, Houston, TX (US); Yuhan Peng, Houston, TX (US)

(73) Assignees: Huawei Technologies Co., Ltd., Shenzhen (CN); William Marsh Rice University

( * ) Notice: Subject to any disclaimer, the term of this patent is extended or adjusted under 35 U.S.C. 154(b) by 0 days.

(21) Appl. No.: 17/175,331

(22) Filed: Feb. 12, 2021

(65) Prior Publication Data
US 2021/0173573 A1 Jun. 10, 2021

Related U.S. Application Data

(63) Continuation of application No. PCT/CN2019/097560, filed on Jul. 24, 2019.

(30) Foreign Application Priority Data

Aug. 16, 2018 (CN) .......................... 201810935171.1

(51) Int. Cl.
G06F 3/06 (2006.01)
(52) U.S. Cl.
CPC ............ *G06F 3/0631* (2013.01); *G06F 3/061* (2013.01); *G06F 3/0673* (2013.01)

(58) Field of Classification Search
CPC ...... G06F 3/0631; G06F 3/061; G06F 3/0673; G06F 3/0659; G06F 3/067; H04L 67/1097
See application file for complete search history.

(56) References Cited

U.S. PATENT DOCUMENTS 8,473,566 B1 * 6/2013 Cardente ............... G06F 3/0647
709/216
2013/0036272 A1 * 2/2013 Nelson ................. H04L 67/1097
711/147

(Continued)

FOREIGN PATENT DOCUMENTS

CN 103442076 A 12/2013
CN 103929366 A 7/2014

(Continued)

OTHER PUBLICATIONS

Peng et al., "bQueue: A Coarse-Grained Bucket QoS Scheduler," 2018 18th IEEE/ACM International Symposium on Cluster, Cloud and Grid Computing, pp. 93-102, Institute of Electrical and Electronics Engineers, New York, New York, (Jul. 16, 2018).

*Primary Examiner* — Ramon A. Mercado
(74) *Attorney, Agent, or Firm* — Leydig, Voit & Mayer, Ltd.

(57) ABSTRACT

The present disclosure discloses a method for assuring quality of service in a storage system, where a control node calculates, based on a quantity of remaining I/O requests of a target storage node in a unit time, a quantity of I/O requests required by a storage resource to reach a lower assurance limit in the unit time, and a quantity of I/O requests need to be processed by the target storage node for the storage resource in the unit time, a lower limit quantity of I/O requests that can be processed by the target storage node for the storage resource in the unit time; allocates, based on the lower limit quantity of I/O requests, a lower limit quantity (Continued)

of tokens of the storage resource on the target storage node in the unit time to the storage resource; and sends the lower limit quantity of tokens to the target storage node.

20 Claims, 6 Drawing Sheets

(56) References Cited

U.S. PATENT DOCUMENTS

| | | | | |
|---|---|---|---|---|
| 2015/0263978 | A1* | 9/2015 | Olson | G06F 3/067 |
| | | | | 709/226 |
| 2018/0167326 | A1* | 6/2018 | Yu | G06F 9/50 |
| 2019/0324662 | A1* | 10/2019 | Yu | G06F 3/0611 |
| 2021/0173573 | A1* | 6/2021 | Yu | G06F 3/061 |
| 2021/0382872 | A1* | 12/2021 | Tang | G06F 16/2379 |

FOREIGN PATENT DOCUMENTS

| | | |
|---|---|---|
| CN | 108196788 A | 6/2018 |
| CN | 109254726 A | 1/2019 |

\* cited by examiner

METHOD FOR ASSURING QUALITY OF SERVICE IN DISTRIBUTED STORAGE SYSTEM, CONTROL NODE, AND SYSTEM

CROSS-REFERENCE TO RELATED APPLICATIONS

This application is a continuation of International Application No. PCT/CN2019/097560, filed on Jul. 24, 2019, which claims priority to Chinese Patent Application No. 201810935171.1, filed on Aug. 16, 2018. The disclosures of the aforementioned applications are hereby incorporated by reference in their entireties.

TECHNICAL FIELD

The present disclosure relates to the field of distributed data storage technologies, and in particular, to a method for assuring quality of service in a distributed storage system, a control node, and a system.

BACKGROUND

Quality of service (QoS), as the name implies, is "service quality" provided for a user, and is sometimes referred to as a service level agreement (SLA). Before delivering an I/O request to a storage node, a storage system needs to perform scheduling or flow control, to ensure that different applications have different QoS. Currently, QoS is mainly measured by an upper flow control limit, a lower assurance limit (reservation), an assurance proportion (share), and the like. In short, QoS ensures application performance, so that the user can appropriately allocate limited storage system processing capabilities.

A dmClock algorithm is a fine-grained QoS control algorithm, and can support three features: the lower assurance limit, the upper flow control limit, and the assurance proportion. However, in the dmClock algorithm, for tag calculation of each request in a distributed storage system, a quantity of requests processed on another storage node needs to be obtained, and therefore communication overheads between storage nodes are high.

SUMMARY

Embodiments of the present disclosure provide a method for assuring quality of service in a distributed storage system, a control node, and a system, to reduce network communication overheads.

According to a first aspect, an embodiment of the present disclosure provides a method for assuring quality of service in a distributed storage system, applied to a control node side. The method includes: obtaining, by a control node based on a quantity of remaining input/output I/O requests of a target storage node in a unit time, a quantity of I/O requests required by a storage resource to reach a lower assurance limit in the unit time, and a quantity of I/O requests that need to be processed by the target storage node for the storage resource in the unit time, a lower limit quantity of I/O requests that can be processed by the target storage node for the storage resource in the unit time, where the distributed storage system includes N storage nodes that provide the storage resource, the target storage node is one of the N storage nodes, and N is a positive integer; allocating, by the control node, a lower limit quantity of tokens that is of the storage resource on the target storage node and that is in the unit time to the storage resource based on the lower limit quantity of I/O requests that can be processed by the target storage node for the storage resource in the unit time; and sending, by the control node, the lower limit quantity of tokens to the target storage node.

According to the method described in the first aspect, for each storage node in the distributed storage system, the control node may allocate, to the storage node, a token that is of the storage resource on the storage node. Therefore, the storage node only needs to correspondingly schedule and process, based on the token allocated by the control node, an I/O request that has the token, and the storage node temporarily does not process an I/O request that does not have the token. Different from an operation in which information about a quantity of requests processed by another node needs to be obtained for tag calculation of each request, in this embodiment of the present disclosure, when a quantity of tokens that is of the storage resource on the target storage node is calculated, only a capability of the target storage node and a requirement of the storage resource on the target storage node need to be considered, and capabilities of other storage nodes do not need to be considered. Therefore, network communication overheads can be reduced. When there are a relatively large quantity of storage nodes, the communication overheads are more significantly reduced, and calculation complexity is reduced.

Optionally, the method further includes: obtaining, by the control node based on the quantity of remaining I/O requests that is of the target storage node and that is in the unit time, a quantity of I/O requests required by the storage resource to reach an upper flow control limit in the unit time, the quantity of I/O requests that need to be processed by the target storage node for the storage resource in the unit time, and the lower limit quantity of I/O requests that can be processed by the target storage node for the storage resource in the unit time, an upper limit quantity of I/O requests that can be processed by the target storage node for the storage resource in the unit time; allocating, by the control node, an upper limit quantity of tokens that is of the storage resource on the target storage node and that is in the unit time to the storage resource based on the upper limit quantity of I/O requests that can be processed by the target storage node for the storage resource in the unit time; and sequentially sending, by the control node, the upper limit quantity of tokens to the target storage node.

Optionally, the obtaining, by a control node based on a quantity of remaining input/output I/O requests of a target storage node in a unit time, a quantity of I/O requests required by a storage resource to reach a lower assurance limit in the unit time, and a quantity of I/O requests that need to be processed by the target storage node for the storage resource in the unit time, a lower limit quantity of I/O requests that can be processed by the target storage node for the storage resource in the unit time includes: calculating, by the control node based on a maximum flow algorithm, the quantity of remaining input/output I/O requests of the target storage node in the unit time, the quantity of I/O requests required by the storage resource to reach the lower assurance limit in the unit time, and the quantity of I/O requests that need to be processed by the target storage node for the storage resource in the unit time, the lower limit quantity of I/O requests that can be processed by the target storage node for the storage resource in the unit time.

Optionally, the obtaining, by the control node based on the quantity of remaining I/O requests of the target storage node in the unit time, a quantity of I/O requests required by the storage resource to reach an upper flow control limit in the unit time, the quantity of I/O requests that need to be processed by the target storage node for the storage resource in the unit time, and the lower limit quantity of I/O requests that can be processed by the target storage node for the storage resource in the unit time, an upper limit quantity of I/O requests that can be processed by the target storage node for the storage resource in the unit time includes: calculating, by the control node, a first value, where the first value is a difference between a second value and a third value, the second value is the quantity of I/O requests required by the storage resource to reach the upper flow control limit in the unit time, and the third value is a sum of lower limit quantities of I/O requests that can be processed by the N storage nodes for the storage resource in the unit time; calculating, by the control node, a fourth value, where the fourth value is a difference between a fifth value and the third value, and the fifth value is the quantity of remaining I/O requests of the target storage node in the unit time; calculating, by the control node, a sixth value, where the sixth value is a difference between a seventh value and the third value, and the seventh value is the quantity of I/O requests that need to be processed by the target storage node for the storage resource in the unit time; and obtaining, by the control node based on the first value, the fourth value, and the sixth value, the upper limit quantity of I/O requests that can be processed by the target storage node for the storage resource in the unit time.

Optionally, the allocating, by the control node, an upper limit quantity of tokens that is of the storage resource on the target storage node and that is in the unit time to the storage resource based on the upper limit quantity of I/O requests that can be processed by the target storage node for the storage resource in the unit time includes: allocating, by the control node, an overcommitment value that is of the storage resource on the target storage node and that is in the unit time to the storage resource according to the following formula: the overcommitment value that is of the storage resource on the target storage node and that is in the unit $$\text{time} = \text{an eigth value} + \frac{(\text{the second value} - \text{a ninth value}) \times \text{the seventh value}}{\text{a tenth value}},$$

where the eighth value is the upper limit quantity of I/O requests that can be processed by the target storage node for the storage resource in the unit time, the ninth value is a sum of upper limit quantities of I/O requests that can be processed by the N storage nodes for the storage resource in the unit time, and the tenth value is a sum of quantities of I/O requests that need to be processed by the N storage nodes for the storage resource in the unit time; and allocating, by the control node, the upper limit quantity of tokens that is of the storage resource on the target storage node and that is in the unit time to the storage resource according to the following formula: the upper limit quantity of tokens that is of the storage resource on the target storage node and that is in the unit time is a sum of the overcommitment value that is of the storage resource on the target storage node and that is in the unit time and the lower limit quantity of tokens that is of the storage resource on the target storage node and that is in the unit time.

Optionally, the obtaining, by the control node based on the first value, the fourth value, and the sixth value, the upper limit quantity of I/O requests that can be processed by the target storage node for the storage resource in the unit time includes:

calculating, by the control node based on a maximum flow algorithm, the first value, the fourth value, and the sixth value, the upper limit quantity of I/O requests that can be processed by the target storage node for the storage resource in the unit time.

Optionally, the method further includes: receiving, by the control node from the target storage node, the quantity of remaining I/O requests of the target storage node in the unit time and the quantity of I/O requests that need to be processed by the target storage node for the storage resource in the unit time.

According to a second aspect, an embodiment of the present disclosure provides a method for assuring quality of service in a distributed storage system, applied to a target storage node side. The distributed storage system includes N storage nodes that provide a storage resource. The N storage nodes include a target storage node, and N is a positive integer. The method includes: receiving, by the target storage node from a control node, a lower limit quantity of tokens that is of a first storage resource on the target storage node and that is in a unit time; obtaining, by the target storage node, a first I/O request in an I/O request queue, where the first I/O request is an I/O request that needs to be processed by the target storage node for the first storage resource; and if a lower limit quantity of tokens that is of the first storage resource on the target storage node is greater than 0, processing, by the target storage node, the first I/O request.

According to the method described in the second aspect, the control node may allocate a token that is of the storage resource on each target storage node to each target storage node. Therefore, the target storage node only needs to correspondingly schedule and process, based on the token allocated by the control node, an I/O request that has the token, and the target storage node temporarily does not process an I/O request that does not have the token, so that control precision can be improved, and network communication overheads and computing overheads can be reduced.

Optionally, the method further includes: if the lower limit quantity of tokens that is of the first storage resource on the target storage node and a lower limit quantity of tokens that is of another storage resource other than the first storage resource on the target storage node each are equal to 0, obtaining, by the target storage node, a second I/O request in the I/O request queue, where the second I/O request is an I/O request that needs to be processed by the target storage node for a second storage resource; and if an upper limit quantity of tokens that is of the second storage resource on the target storage node is greater than 0, processing, by the target storage node, the second I/O request, where the upper limit quantity of tokens is received by the target storage node from the control node.

Optionally, before the receiving, by the target storage node from a control node, a lower limit quantity of tokens that is of a first storage resource on the target storage node and that is in a unit time, the method further includes: sending, by the target storage node to the control node, a quantity of remaining I/O requests that is of the first storage resource on the target storage node and that is in the unit time and a quantity of I/O requests that need to be processed by the target storage node for the first storage resource in the unit time, where the quantity of remaining I/O requests that is of the first storage resource on the target storage node and that is in the unit time and the quantity of I/O requests that need to be processed by the target storage node for the first storage resource in the unit time are used by the control node to allocate, to the first storage resource, a quantity of tokens that is of the first storage resource on the target storage node and that is in the unit time.

According to a third aspect, an embodiment of the present disclosure provides a control node, where the control node includes units configured to implement the first aspect or any possible implementation of the first aspect. The units may be implemented by hardware, for example, a processor, or may be implemented by hardware by executing corresponding software, or may be implemented by software.

According to a fourth aspect, an embodiment of the present disclosure provides a storage node, including units for implementing the second aspect or any possible implementation of the second aspect. The units may be implemented by hardware, for example, a processor, or may be implemented by hardware by executing corresponding software, or may be implemented by software.

According to a fifth aspect, an embodiment of the present disclosure provides a control node, configured to perform the method for assuring quality of service in the distributed storage system described in the first aspect. The control node includes a processor and a communications interface. The processor communicates with the communications interface, and the processor is configured to perform the method provided in the first aspect or the method provided in any possible implementation of the first aspect.

According to a sixth aspect, an embodiment of the present disclosure provides a storage node, configured to perform the method for assuring quality of service in the distributed storage system described in the second aspect. The control node may include a processor and a communications interface. The processor communicates with the communications interface, and the processor is configured to perform the method provided in the second aspect or the method provided in any possible implementation of the second aspect.

According to a seventh aspect, an embodiment of the present disclosure provides a distributed storage system, including a control node and a storage node, where the control node is used to perform the method provided in the first aspect, or the method provided in any possible implementation of the first aspect.

According to an eighth aspect, an embodiment of the present disclosure provides a readable storage medium, and the readable storage medium stores an instruction. When the instruction stored in the readable storage medium is run on the device, the device is enabled to perform the method for assuring quality of service in a distributed storage system in first aspect or the second aspect.

According to a ninth aspect, an embodiment of the present disclosure provides a computer program product. When the computer program product runs on a computer, the computer is enabled to perform the method for assuring quality of service in a distributed storage system in first aspect or the second aspect.

BRIEF DESCRIPTION OF DRAWINGS

To describe the technical solutions in the embodiments of the present disclosure more clearly, the following briefly describes the accompanying drawings required for describing the embodiments of the present disclosure.

DESCRIPTION OF EMBODIMENTS

The following describes the embodiments of the present disclosure with reference to the accompanying drawings in the embodiments of the present disclosure.

Figure 1:
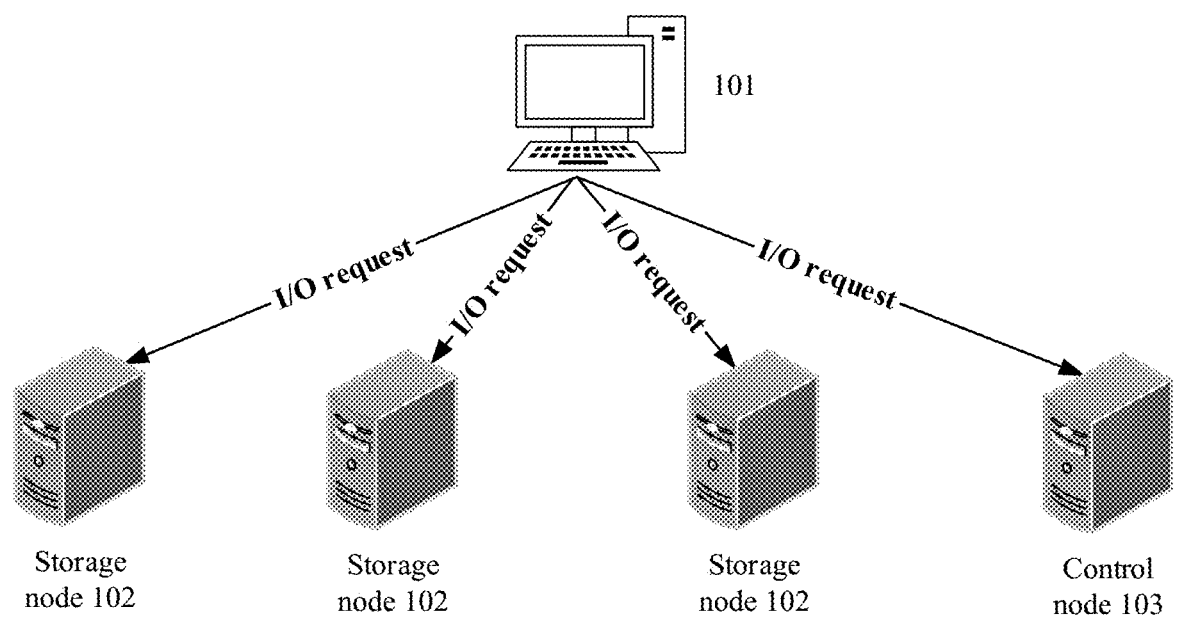
FIG. 1 is a schematic diagram of an architecture of a distributed storage system according to an embodiment of the present disclosure.

FIG. 1 is a schematic diagram of an architecture of a distributed storage system according to an embodiment of the present disclosure. The distributed storage system 100 includes one or more storage nodes 102 and a control node 103. A client may access the distributed storage system shown in FIG. 1, and there may be one or more clients 101.

The storage node 102 may be a server. The control node 103 may also be a server. The client 101 may be a device used by a tenant/customer/user, for example, a computer. The client 101 may apply to the storage node 102 for a storage resource used to store data. The storage resource may be a logical unit number (LUN) in block storage, a file system in file storage, a bucket in an object storage system, or the like. The client 101 may further send an input/output (I/O) request to the storage node 102, to write data into the storage resource or read data from the storage resource. The storage node is configured to provide the storage resource in the distributed storage system.

The storage node 102 may further send, to the control node 103, requirement information that is of the storage resource on the storage node 102 and a capability of the storage node 102. Herein, the requirement information may be a quantity of I/O requests that need to be processed by the storage node 102 for the storage resource in a unit time (for example, per second). The capability may further be a quantity of I/O requests that can be further processed by the storage node 102 on a remaining storage resource, computing resource, and the like, and that is in the unit time.

The control node 103 collects the requirement information reported by the storage node 102 and the capability of the storage node 102. In addition, the control node 103 further needs to obtain a quantity of I/O requests that need to be further completed for the storage resource to reach a lower assurance limit in the unit time and a quantity of I/O requests that can be further completed for the storage resource to meet an upper flow control limit in the unit time. For example, when applying to the storage node 102 for the storage resource, each client may set a lower assurance limit and an upper flow control limit in the unit time. In this embodiment of the present disclosure, the lower assurance limit in the unit time may be understood as a minimum quantity of I/O requests that need to be processed by the storage node for the storage resource in the unit time (for example, per second), for example, a minimum value of input/output per second (TOPS). Correspondingly, the upper flow control limit in the unit time can be understood as a maximum quantity of I/O requests that need to be processed by the storage node for the storage resource in the unit time (for example, per second). The quantity of I/O requests that need to be further completed for the storage resource to reach the lower assurance limit in the unit time can also be understood as a difference between the lower assurance limit set by the client or tenant and a quantity of I/O requests that have been completed for the storage resource in the unit time. The quantity of I/O requests that need to be further completed for the storage resource to reach the lower assurance limit in the unit time is also known as a quantity of I/O requests required by the storage resource to reach the lower assurance limit in the unit time. Similarly, the quantity of I/O requests that can be further completed for the storage resource to meet the upper flow control limit in the unit time can be understood as a difference between an upper flow control limit set by the client or tenant and the quantity of I/O requests that have been completed for the storage resource in the unit time. For example, when a client 1 applies for a storage resource 1, a set lower assurance limit is 200 I/O requests per second. For example, the control node needs to calculate a quantity of I/O requests that need to be processed by the storage node 1 for the storage resource 1 in a time period of one second from a first second to a second second. First, the control node needs to pre-calculate a quantity of I/O requests required by the storage resource 1 to reach the lower assurance limit at a current moment. If the current moment is a $1.5^{th}$ second, if the control node collects statistics on another storage node, and if a storage node 2 and a storage node 3 have processed 100 I/O requests for the storage resource 1, the control node calculates that the quantity of I/O requests that need to be further completed for the storage resource 1 to reach the lower assurance limit in the time period from the first second to the second second is equal to 100 (200−100). For another example, five seconds are used as an example. If the set lower assurance limit is 200 I/O requests per second when the client 1 applies for the storage resource 1, at least 1000 (200×5) I/O requests need to be processed for the storage resource 1 in the five seconds. For example, the control node needs to calculate a quantity of I/O requests that need to be processed by the storage node 1 for the storage resource 1 in a time period of one second from the second second to a third second. First, the control node needs to pre-calculate a quantity of I/O requests required by the storage resource 1 to reach the lower assurance limit at a current moment. If the current moment is the second second, if the control node collects statistics on another storage node, and if the storage node 2 and the storage node 3 have processed 300 I/O requests for the storage resource 1, the control node calculates that the quantity of I/O requests that need to be further completed for the storage resource 1 to reach the lower assurance limit in the time period from the second second to the third second is equal to 700 (1000−300).

The control node 103 calculates, based on the requirement information reported by each storage node 102 in the unit time, the capability of the storage node 102 in the unit time, the quantity of I/O requests required by the storage resource to reach the lower assurance limit in the unit time, and the quantity of I/O requests required by the storage resource to meet the upper flow control limit in the unit time, a control parameter value of QoS that is of the storage resource on the storage node 102 and that is in the unit time. The control parameter value includes a lower limit quantity of tokens and an upper limit quantity of tokens that are of the storage resource on the storage node 102 and that are in the unit time. For example, the control node 103 calculates, based on the requirement information that is reported by the storage node 102 and that is in the unit time, the capability of the storage node 102 in the unit time, and the quantity of I/O requests required by the storage resource to reach the lower assurance limit in the unit time, the lower limit quantity of tokens that is of the storage resource on the storage node 102 and that is in the unit time. The control node 103 calculates, based on the requirement information that is reported by the storage node 102 and that is in the unit time, the capability of the storage node 102 in the unit time, and the quantity of I/O requests required by the storage resource to meet the upper flow control limit in the unit time, the upper limit quantity of tokens that is of the storage resource on the storage node 102 and that is in the unit time. The lower limit quantity of tokens that is in the unit time refers to a minimum quantity of I/O requests that can be further processed by the storage node 102 for the tenant or the storage resource in the unit time, so that the storage resource reaches the lower assurance limit in the unit time. Therefore, the lower limit quantity of tokens that is in the unit time is also referred to as a lower limit of the quantity of tokens that is in the unit time, or a lower limit (minimum value) of the quantity of I/O requests that is processed for the tenant or the storage resource in the unit time. The upper limit quantity of tokens that is in the unit time refers to a maximum quantity of I/O requests that can be further processed by the storage node 102 for the storage resource in the unit time, so that the storage resource reaches the upper flow control limit in the unit time. Therefore, the upper limit quantity of tokens that is in the unit time is also referred to as an upper limit of the quantity of tokens that is in the unit time, or an upper limit (a maximum quantity) of I/O requests that is processed for the tenant or the storage resource in the unit time. After allocating the control parameter value, the control node 103 distributes the control parameter value to each storage node 102. Each storage node 102 achieves, based on the received control parameter value, an objective for assuring QoS.

It should be noted that the quantity of remaining I/O requests of the storage node in the unit time refers to the quantity of I/O requests that can be further processed/executed by the storage node.

Figure 2:
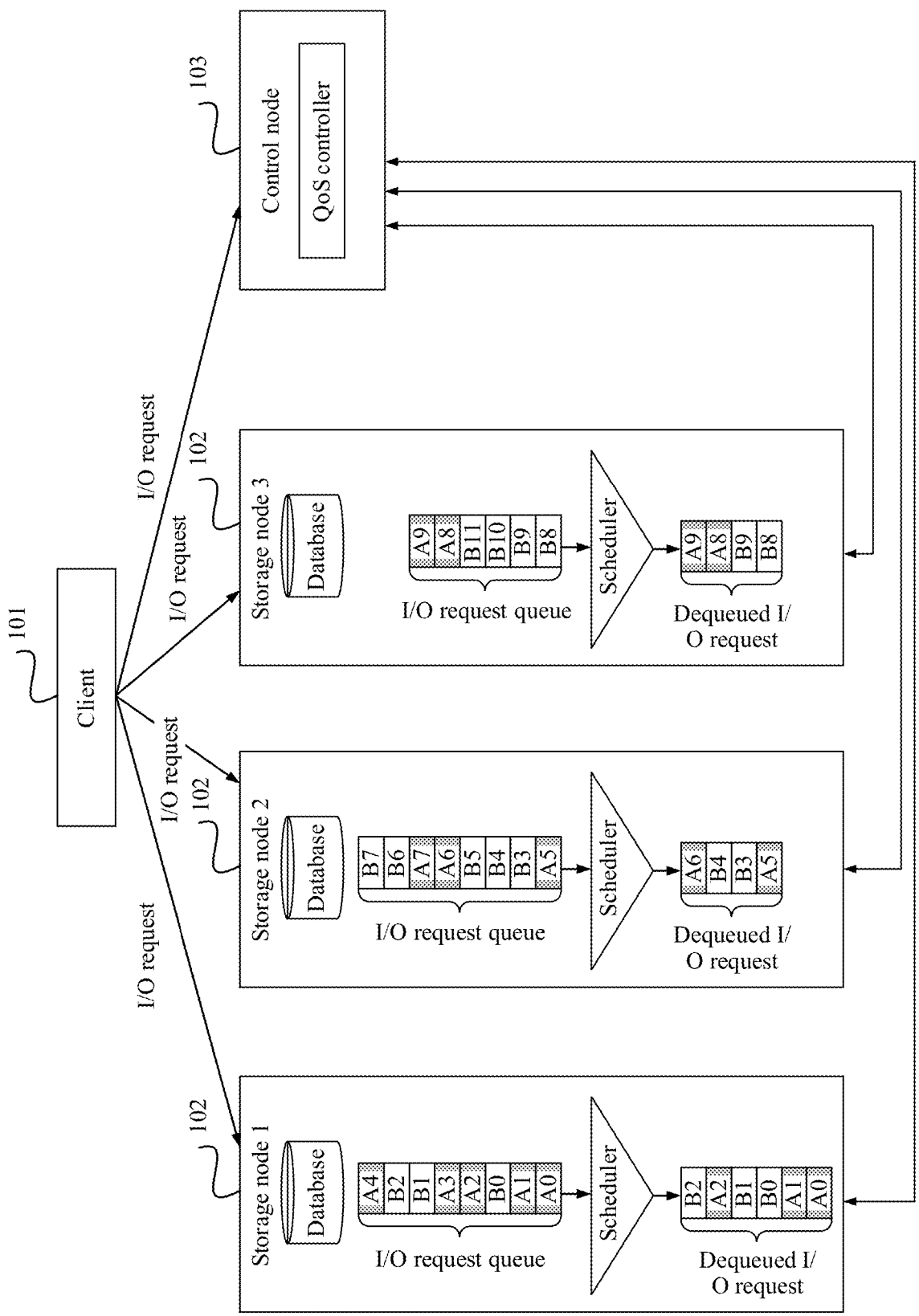
FIG. 2 is a schematic principal diagram of a method for assuring quality of service in a distributed storage system according to an embodiment of the present disclosure.

For example, FIG. 2 is a schematic principal diagram of a method for assuring quality of service in a distributed storage system according to an embodiment of the present disclosure. As shown in FIG. 2, a client sends an I/O request to a storage node 102, to read/write data. The storage node 102 stores the data or reads the data based on the I/O request sent by the client. In FIG. 2, a letter A represents an I/O request sent by a client A to the storage node 102, and a letter B represents an I/O request sent by a client B to the storage node 102. Each storage node 102 sorts the received I/O requests in a queue based on a receiving sequence. For example, an I/O queue of a storage node 1 is ranked as follows: A0, A1, B0, A2, A3, B1, B2, and A4, where a former I/O request represents a request received by the storage node 1 earlier, and a latter I/O request represents a request received by the storage node 1 later. A1 to A4 are I/O requests sent by the client A to the storage node 1, and B0 to B2 are I/O requests sent by the client B to the storage node 1. Likewise, an I/O queue of a storage node 2 is ranked as follows: A5, B3, B4, B5, A6, A7, B6, and B7. A5 to A7 are I/O requests sent by the client A to the storage node 2, and B3 to B7 are I/O requests sent by the client B to the storage node 2. An I/O queue of a storage node 3 is ranked as follows: B8, B9, B10, B11, A8, and A9. A8 to A9 are I/O requests sent by the client A to the storage node 3, and B8 to B11 are I/O requests sent by the client B to the storage node 3.

The storage node 1 sends, to the control node 103, a quantity of I/O requests that need to be processed by the storage node 1 for the client A in a unit time (for example, one second), a quantity of I/O requests that need to be processed by the storage node 1 for the client B in the unit time, and a quantity of remaining I/O requests of the storage node 1 in the unit time. The quantity of remaining I/O requests of the storage node in the unit time refers to a quantity of I/O requests that can be further processed by the storage node in the unit time. Similarly, the storage node 2 sends, to the control node 103, a quantity of I/O requests that need to be processed by the storage node 1 for the client A in the unit time, a quantity of I/O requests that need to be processed by the storage node 2 for the client B in the unit time, and a quantity of remaining I/O requests of the storage node 2 in the unit time. The storage node 3 sends, to the control node 103, a quantity of I/O requests that need to be processed by the storage node 3 for the client A in the unit time, a quantity of I/O requests that need to be processed by the storage node 3 for the client B in the unit time, and a quantity of remaining I/O requests of the storage node 3 in the unit time. In addition, the control node 103 further needs to obtain a quantity of I/O requests that need to be further completed for a storage resource of the client A to reach a lower assurance limit in the unit time, a quantity of I/O requests that can be further completed for the storage resource of the client A to meet an upper flow control limit in the unit time, a quantity of I/O requests that need to be further completed for a storage resource of the client B to reach a lower assurance limit in the unit time, and a quantity of I/O requests that can be further completed for the storage resource of the client B to meet an upper flow control limit in the unit time. The control node 103 calculates, based on the quantity of I/O requests that need to be processed by the storage node 1 for the client A in the unit time, the quantity of remaining I/O requests of the storage node 1 in the unit time, and the quantity of I/O requests that need to be further completed for the storage resource of the client A to reach the lower assurance limit in the unit time, a lower limit quantity of tokens that is of the client A on the storage node 1 and that is in the unit time. The control node 103 calculates, based on the quantity of I/O requests that need to be processed by the storage node 1 for the client A in the unit time, a quantity of I/O requests that can be further processed by the storage node 1 in the unit time, and a quantity of remaining I/O requests that is of the storage resource of the client A to reach the upper flow control limit in the unit time, an upper limit quantity of tokens that is of the client A on storage node 1 and that is in the unit time. Correspondingly, the control node 103 calculates, based on the quantity of I/O requests that need to be processed by the storage node 1 for the client B in the unit time, the quantity of remaining I/O requests of the storage node 1 in the unit time, and the quantity of I/O requests that need to be further completed for the storage resource of the client B to reach the lower assurance limit in the unit time, a lower limit quantity of tokens that is of the client B on storage node 1 and that is in the unit time. The control node 103 calculates, based on the quantity of I/O requests that need to be processed by the storage node 1 for the client B in the unit time, the quantity of remaining I/O requests of the storage node 1 in the unit time, and a quantity of remaining I/O requests of the storage resource of the client B to reach the upper flow control limit in the unit time, an upper limit quantity of tokens that is of the client B on the storage node 1 and that is in the unit time. A manner in which the control node 103 calculates a lower limit quantity of tokens of the client A or the client B on the storage node 2 or the storage node 3 is similar to the manner in which the control node 103 calculates a lower limit quantity of tokens of the client A or the client B on the storage node 1. A manner in which the control node 103 calculates an upper limit quantity of tokens of the client A or the client B on the storage node 2 or the storage node 3 is similar to a manner in which the control node 103 calculates an upper limit quantity of tokens of the client A or the client B on the storage node 1. Details are not described herein again.

After calculating the lower limit quantity of tokens that is of the client A or the client B on the storage node 1 and that is in the unit time, the control node 103 sends the lower limit quantity of tokens to the storage node 1. After calculating the lower limit quantity of tokens that is of the client A or the client B on the storage node 2 and that is in the unit time, the control node 103 sends the lower limit quantity of tokens to the storage node 2. After calculating the lower limit quantity of tokens that is of the client A or the client B on the storage node 3 and that is in the unit time, the control node 103 sends the lower limit quantity of tokens to the storage node 3. The method for assuring quality of service in this embodiment of the present disclosure reduces communication between storage nodes, and reduces communication overheads.

Similarly, after calculating the upper limit quantity of tokens that is of the client A or the client B on the storage node and that is in the unit time, the control node sends the upper limit quantity of tokens to the corresponding storage node.

On the storage node, for a same storage resource, there are a lower limit token bucket and an upper limit token bucket that correspond to the storage resource. Tokens in the lower limit token bucket are lower limit tokens, and tokens in the upper token bucket are upper limit tokens. A scheduler of the storage node 1 directs a next pointer towards a first (namely, ranked ahead) I/O request (namely, A0 in FIG. 2) in the I/O request queue according to a first in first out (FIFO) policy, and determines whether A0 has the lower limit token. For example, a determining manner may be determining whether a quantity of tokens in the lower limit token bucket of the client A on the storage node 1 is greater than 0. If the quantity of tokens in the lower limit token bucket of the client A on the storage node 1 is greater than 0, it indicates that the request A0 has the lower limit token. If the quantity of tokens in the lower limit token bucket of the client A on the storage node 1 is equal to 0, it indicates that the request A0 does not have the lower limit token. If A0 has the lower limit token, the scheduler dequeues A0, processes (or executes) the A0 request, and subtracts the quantity of tokens in the lower limit token bucket of the client A on the storage node 1 by 1. For example, when the request A0 is used to request to read data 1 of the client A, the scheduler obtains the data 1 of the client A from a database, and returns the data 1 to the client A. After executing the request A0, the scheduler directs the next pointer towards a next request in the queue, namely, A1 in FIG. 2. If A0 does not have the lower limit token, the scheduler directs the next pointer towards the next request in the queue, namely, A1 in FIG. 2. Then, the scheduler determines whether A1 has the lower limit token. A determining manner is similar to that of A0. Details are not described herein again. Then the scheduler directs the next pointer towards a next request in the queue, namely, B0 in FIG. 2, and determines whether B0 has the lower limit token. For example, a determining manner may be determining whether a lower limit quantity of tokens of the client B on the storage node 1 is greater than 0. If the lower limit quantity of tokens of the client B on the storage node 1 is greater than 0, it indicates that the request B0 has the lower limit token. If the lower limit quantity of tokens of the client B on the storage node 1 is equal to 0, it indicates that the request B0 does not have the lower limit token. If B0 has the lower limit token, the scheduler dequeues B0, processes (or executes) the request B0, and subtracts the lower limit quantity of tokens of the client B on the storage node 1 by 1. After executing the request B0, the scheduler directs the next pointer towards a next request in the queue. If B0 does not have a lower limit token, the scheduler directs the next pointer towards a next request in the queue.

After the scheduler traverses the I/O request queue, I/O requests having the lower limit token have been processed, and I/O requests having no lower limit token are not processed temporarily. Then, the scheduler of the storage node 1 re-points the next pointer to the first (namely, ranked ahead) I/O request (assumed to be B0 in FIG. 2) in the I/O request queue, and determines whether B0 has the upper limit token. For example, a determining manner may be determining whether a quantity of tokens in the upper token bucket of the client B on the storage node 1 is greater than 0. If the quantity of tokens in the upper token bucket of the client B on the storage node 1 is greater than 0, it indicates that the request B0 has the upper limit token. If the quantity of tokens in the upper token bucket of the client B on the storage node 1 is equal to 0, it indicates that the request B0 does not have the upper limit token. If B0 has the upper limit token, the scheduler dequeues B0, processes (or executes) the B0 request, and subtracts the quantity of tokens in the upper limit token bucket of the client B on the storage node 1 by 1. Then, the scheduler directs the next pointer towards a next request in the queue until the entire I/O request queue is traversed. After the scheduler traverses the I/O request queue, I/O requests having the upper limit token are processed, and I/O requests having no upper limit token are not processed temporarily.

The scheduler determines, based on the lower limit quantity of tokens and the upper limit quantity of tokens that are of the storage resource on the storage node, a quantity of I/O requests executed for the storage resource, to implement I/O request scheduling.

By implementing the foregoing method for assuring quality of service in the distributed storage system, on each storage node, an objective of the lower assurance limit in the distributed storage system is achieved through deployment of a token control mechanism and the I/O request scheduling implemented by the scheduler, to implement QoS assurance. In addition, the upper flow control limit can be implemented. Specific descriptions are provided in the following embodiments.

Figure 3:
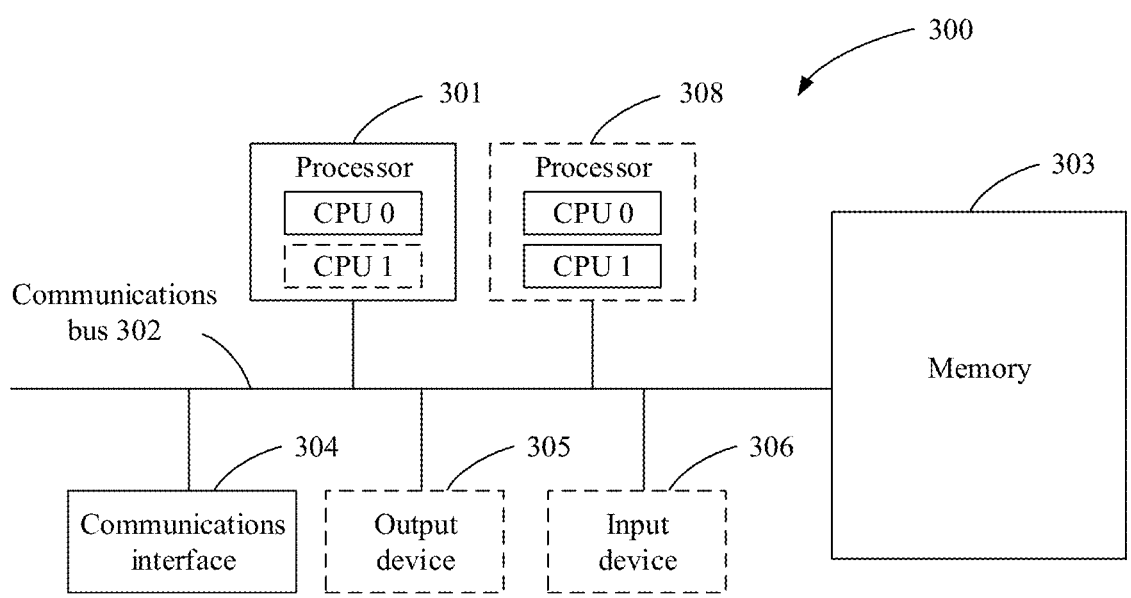
FIG. 3 is a schematic diagram of a computer device according to an embodiment of the present disclosure.

For the control node and the storage node 102 in FIG. 2, refer to a server structure shown in FIG. 3. The computer device 300 includes at least one central processing unit (CPU) 301, a communications bus 302, a memory 303, and at least one communications interface 304. A server shown in FIG. 3 further includes a storage device, for example, a mechanical hard disk and/or a solid-state drive.

The CPU 301 executes a computer instruction in the memory 303, to implement this embodiment of the present disclosure. In addition, to save computing resources of the CPU 301, a field programmable gate array (FPGA) or other hardware may also be configured to perform all operations of the CPU 301 in this embodiment of the present disclosure. Alternatively, the FPGA or other hardware and the CPU 301 are separately configured to perform operations of the CPU 301 in this embodiment of the present disclosure. For ease of description, in this embodiment of the present disclosure, the CPU 301 and the memory 303 are referred to as a processor, or the FPGA and other hardware that replaces the CPU 301 are referred to as a processor, or a combination of the FPGA and other hardware that replaces the CPU 301 and the CPU 301 is collectively referred to as a processor. The processor communicates with the communications interface 304. The communications interface 304 may be a network interface card (NIC), a host bus adapter (HBA), or the like.

The communications bus 302 may include a path for transmitting information between the foregoing components. The communications interface 304, which uses any apparatus such as a transceiver, is configured to communicate with another device or communications network, such as Ethernet, a radio access network (RAN), or a wireless local area network (WLAN).

The memory 303 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, or the like), a magnetic disk storage medium or another magnetic storage device, or any other medium that can be used to carry or store expected program code in a form of an instruction or a data structure and that can be accessed by a computer. However, the memory 303 is not limited thereto. The memory may exist independently, and is connected to the processor through the bus. The memory may alternatively be integrated with the processor.

In specific implementation, in an embodiment, a CPU is used as an example of the processor 301, and the processor 301 may include one or more CPUs, for example, a CPU 0 and a CPU 1 in FIG. 3.

The storage node 102 in FIG. 2 may be the device shown in FIG. 3, and the memory of the storage node 102 stores one or more software modules (such as an interaction module and a processing module). The control node 103 in FIG. 2 may be the device shown in FIG. 3, and the memory of the control node 103 stores one or more software modules (such as an interaction module and a processing module). The storage node or the control node may implement the software module through the processor and program code in the memory, to ensure quality of service in a distributed storage system.

Figure 4A:
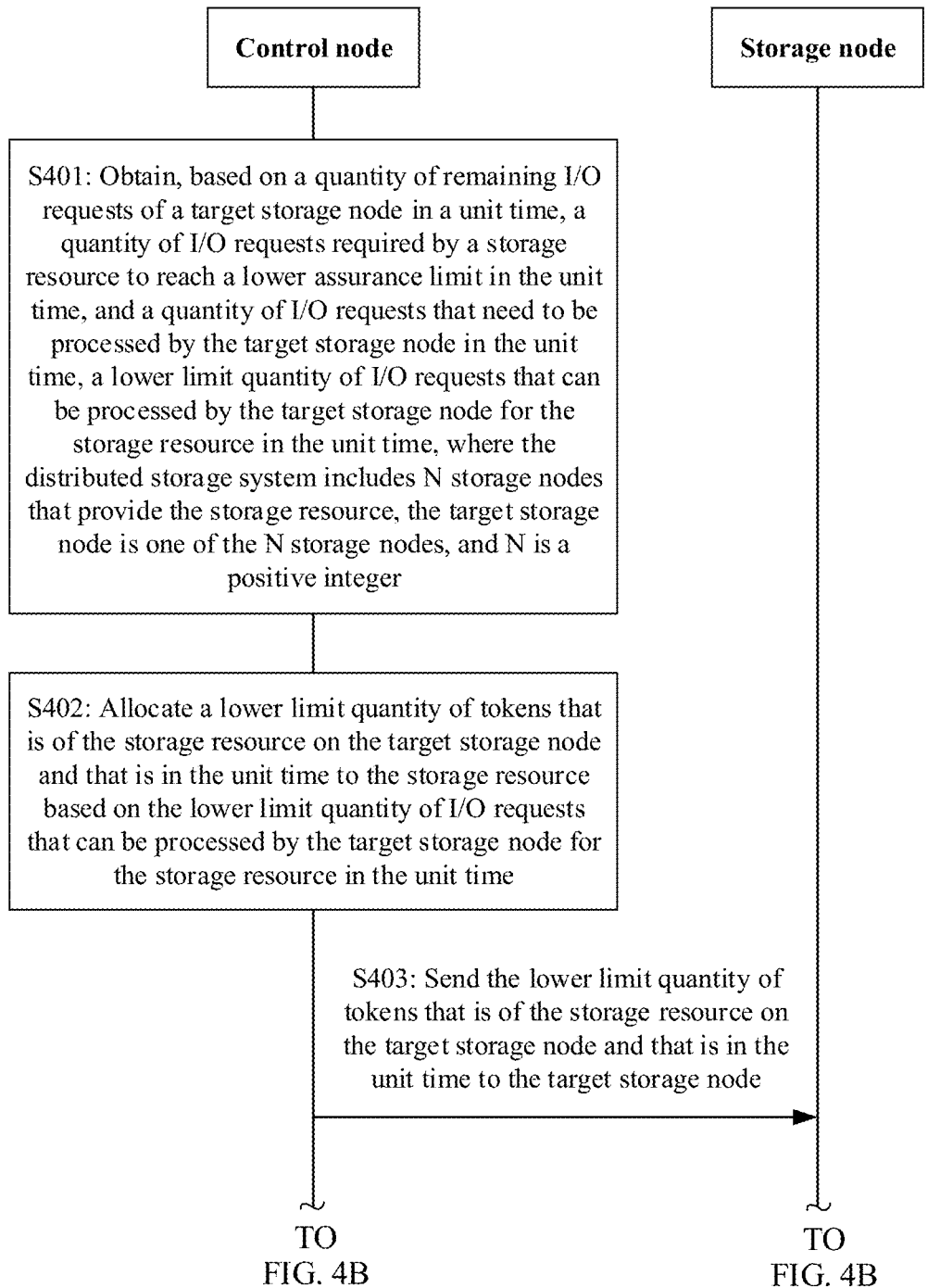
FIG. 4A and FIG. 4B are a flowchart of a method for assuring quality of service in a distributed storage system according to an embodiment of the present disclosure.
Figure 4B:
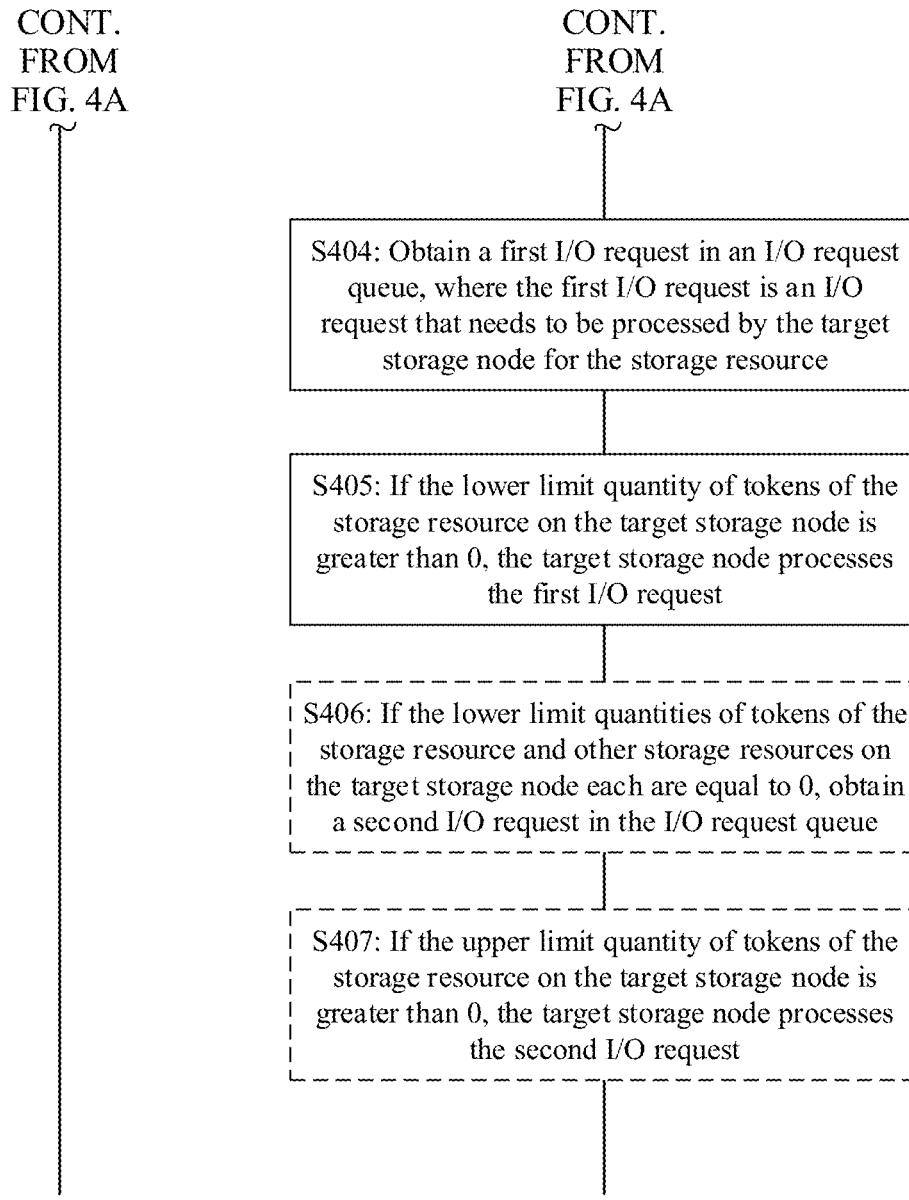

Based on the distributed storage architecture shown in FIG. 1, and the schematic structural diagrams of the storage node and the control node shown in FIG. 3, an embodiment of the present disclosure provides a method for assuring quality of service in a distributed storage system. Referring to FIG. 4A and FIG. 4B, FIG. 4A and FIG. 4B are a flowchart of a method for assuring quality of service in a distributed storage system according to an embodiment of the present disclosure, the method includes the following steps.

S401: A control node obtains, based on a quantity of remaining input/output I/O requests of a target storage node in a unit time, a quantity of I/O requests required by a storage resource to reach a lower assurance limit in the unit time, and a quantity of I/O requests that need to be processed by the target storage node in the unit time, a lower limit quantity of I/O requests that can be processed by the target storage node for the storage resource in the unit time, where the distributed storage system includes N storage nodes that provide the storage resource, the target storage node is one of the N storage nodes, and N is a positive integer.

For ease of description, an example in which a storage node j in the N storage nodes is used as the target storage node is used for description. Other storage nodes are similar. For ease of description, a quantity of remaining I/O requests that can be processed by the storage node j in a unit time (for example, one second from a first second to a second second) is represented by $RC_j$. A quantity of I/O requests required by the storage resource i to reach the lower assurance limit in the unit time is represented by $RR_i$. A quantity of I/O requests that need to be processed by the storage node j for the storage resource i in the unit time is represented by $D_{ij}$. A lower limit quantity of I/O requests that can be processed by the storage node j for the storage resource i in the unit time is represented by $f_{ij}$.

In an implementation, the lower limit quantity of I/O requests that can be processed by the storage node j for the storage resource i in the unit time may be calculated according to a maximum flow algorithm, $RC_j$, $RR_i$, and $D_{ij}$.

Figure 5:
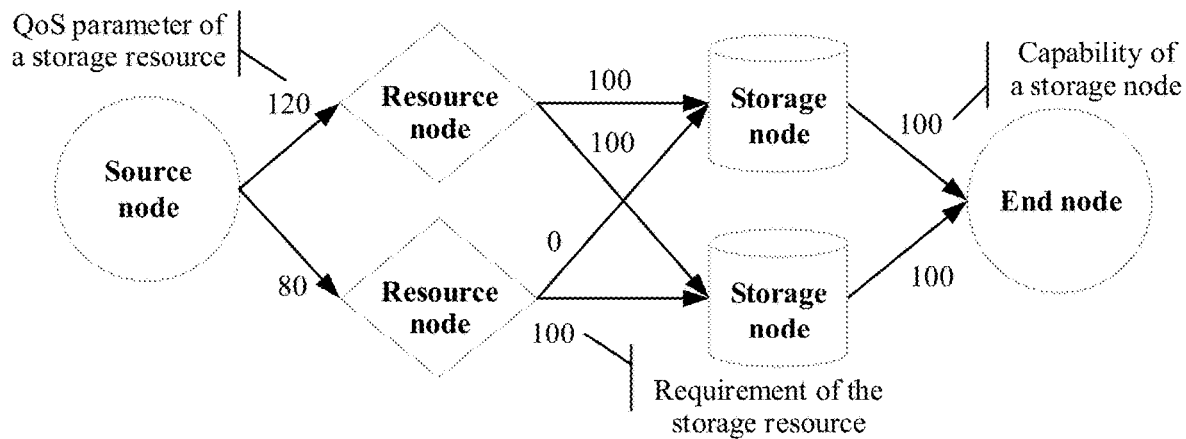
FIG. 5 is a schematic diagram of a directed graph according to an embodiment of the present disclosure.

For example, the lower limit quantity of I/O requests that can be processed by the storage node j for the storage resource i in the unit time is calculated according to the following algorithm:

A directed graph shown in FIG. 5 is constructed. The directed graph includes four types of nodes. A source node and a destination node are virtual nodes, respectively representing a start node and an end node that are of the directed graph, and a resource node represents a storage resource. A weight of an edge from the source node to the resource node represents a QoS parameter corresponding to the resource node in a unit time, a weight of an edge from the resource node to the storage node represents a requirement value of the storage resource for the storage node in the unit time, and a weight of an edge from the storage node to the end node represents a node capability of the storage node in the unit time.

For each edge (u, v) in the directed graph, default traffic f (u, v) is set to 0, where u and v represent nodes in the constructed directed graph, u represents a start node of the edge, and v represents an end node of the edge. Corresponding to FIG. 5, if u represents the source node, v represents the resource node; or if u represents the resource node, v represents the storage node. f(u, v) represents traffic of the edge from the node u to the node v, in other words, a quantity of allocated tokens (or a token speed). According to a breadth-first search algorithm, a path from a source node to an end node is obtained, where the path is: the source node→a resource node i→a storage node j→the end node. Remaining traffic between each adjacent node on the path is calculated as follows: cf(u,v)=c(u, v)−f (u, v), where c(u, v) is an initially set weight of an edge, for example, a weight from the source node to the resource node i is RRi, a weight from the resource node i to the storage node j is RCij, and a weight from the storage node j to the end node is Dj. If the path is found and each cf(u,v) is greater than 0, cf(p) is calculated to be equal to a minimum value of these cf(u,v), and then the f(u,v) of each edge is calculated: f(u,v)=f(u, v)+cf(p).

If no path is found through search, traffic f (the resource node i, the storage node j) of the edge from the resource node i to the storage node j=f (u, v) is output, and the algorithm ends.

The traffic of the edge from the resource node i to the storage node j is the lower limit quantity of I/O requests that can be processed by the storage node j for the storage resource i in the unit time (for example, one second).

S402: The control node allocates a lower limit quantity of tokens that is of the storage resource on the target storage node and that is in the unit time to the storage resource based on the lower limit quantity of I/O requests that can be processed by the target storage node for the storage resource in the unit time.

In an implementation, the lower limit quantity of tokens that is of the storage resource on the target storage node and that is in the unit time is equal to a quantity of I/O requests that can be processed by the target storage node for the storage resource in the unit time.

In another implementation, the lower limit quantity of tokens that is of the storage resource on the target storage node and that is in the unit time is equal to: a quantity of I/O requests that can be processed by the target storage node for the storage resource in the unit time plus or minus a predetermined value. The predetermined value may be a value preset by the control node.

S403: The control node sends the lower limit quantity of tokens that is of the storage resource on the target storage node and that is in the unit time to the target storage node, and the target storage node receives, from the control node, the lower limit quantity of tokens that is of the storage resource on the target storage node and that is in the unit time.

For example, the control node sends a lower limit quantity of tokens that is of a storage resource 1 on a storage node 1 and that is in the unit time to the storage node 1, sends a lower limit quantity of tokens that is of the storage resource 1 on a storage node 2 and that is in the unit time to the storage node 2, and sends a lower limit quantity of tokens that is of the storage resource 1 on a storage node 3 and that is in the unit time to the storage node 3.

S404: The storage node obtains a first I/O request in an I/O request queue, where the first I/O request is an I/O request that needs to be processed by the target storage node for the storage resource.

The storage node obtains an I/O request that is ranked ahead in the I/O request queue, and determines whether the I/O request has the lower limit token. If the I/O request has the lower limit token, step S405 is performed. If the I/O request does not have the lower limit token, the storage node directs a next pointer towards a next I/O request in the I/O request queue, and continues to determine whether the I/O request has the lower limit token until all I/O requests in the I/O request queue are traversed. A manner of determining, by the storage node, whether the I/O request has the lower limit token may include: determining whether a lower limit quantity of tokens of the storage resource that is on the storage node and that corresponds to the I/O request is greater than 0. If the lower limit quantity of tokens of the storage resource that is on the storage node and that corresponds to the I/O request is greater than 0, it indicates that the I/O request has the lower limit token. If the lower limit quantity of tokens of the storage resource that is on the storage node and that corresponds to the I/O request is equal to 0, it indicates that the I/O request does not have the lower limit token. The storage resource that corresponds to the I/O request means that the I/O request is a request that needs to be processed by the storage node for the storage resource.

S405: If the first I/O request has the lower limit quantity of tokens, the target storage node processes the first I/O request.

Optionally, in addition to the lower limit quantity of tokens, the control node may further allocate an upper limit quantity of tokens of the storage resource on the target storage node to the storage resource. Specifically, the control node calculates, based on a quantity (RCa) of remaining I/O requests that is of the target storage node and that is in the unit time, a quantity ($RL_i$) of I/O requests required by the storage resource to reach an upper flow control limit in the unit time, the quantity ($D_{ij}$) of I/O requests that need to be processed by the target storage node for the storage resource in the unit time, and a sum ($\Sigma_j f_{ij}$) of lower limit quantities of I/O requests that can be processed by the target storage node for the storage resource in the unit time, an upper limit quantity ($g_{ij}$) of I/O requests that can be processed by the target storage node for the storage resource in the unit time. The control node allocates an upper limit quantity of tokens that is of the storage resource on the target storage node and that is in the unit time to the storage resource based on the upper limit quantity of I/O requests that can be processed by the target storage node for the storage resource in the unit time. The control node sends the upper limit quantity of tokens that is of the storage resource on the target storage node and that is in the unit time to the target storage node. The target storage node receives, from the control node, the upper limit quantity of tokens that is of the storage resource on the target storage node and that is in the unit time.

For ease of description, a quantity of remaining I/O requests that can be processed by the storage node j in the unit time is represented by $RC_j$. A quantity of I/O requests required by the storage resource i to reach the upper flow control limit in the unit time is represented by $RL_j$. A quantity of I/O requests that need to be processed by the storage node j for the storage resource i in the unit time is represented by $D_{ij}$. A lower limit quantity of I/O requests that can be processed by the storage node j for the storage resource i in the unit time is represented by $f_{ij}$. A sum of lower limit quantities of I/O requests that can be processed by the N storage nodes for the storage resource i in the unit time is equal to $\Sigma_{j=0}^{N} f_{ij}$. An upper limit quantity of I/O requests that can be processed by the storage node j for the storage resource i in the unit time is represented by $g_{ij}$.

In an implementation, a manner in which the control node calculates the upper limit quantity of I/O requests that can be processed by the storage node j for the storage resource i in the unit time may be:

calculating a first value, where the first value=$RL_j - \Sigma_{j=0}^{N} f_{ij}$; calculating a fourth value, where the fourth value=$RC_j - \Sigma_{j=0}^{N} f_{ij}$; and calculating a sixth value, where the sixth value=$D_{ij} - \Sigma_{j=0}^{N} f_{ij}$. Then, the upper limit quantity of I/O requests that can be processed by the storage node j for the storage resource i in the unit time is calculated based on the first value, the fourth value, and the sixth value. Optionally, a manner of calculating, based on the first value, the fourth value, and the sixth value, the upper limit quantity of I/O requests that can be processed by the storage node j for the storage resource i in the unit time may be: calculating, based on a maximum-flow algorithm, the first value, the fourth value, and the sixth value, the upper limit quantity of I/O requests that can be processed by the storage node j for the storage resource i in the unit time.

In an implementation, that the control node allocates, to the storage resource i based on the upper limit quantity of I/O requests that can be processed by the storage node j for the storage resource i in the unit time, an upper limit quantity of tokens that is of the storage resource i on the storage node j and that is in the unit time includes:

The control node allocates an overcommitment value that is of the storage resource i on the storage node j and that is in the unit time to the storage resource i according to the following formula:

$$h_{ij} = g_{ij} + \frac{\left(RLi - \sum_{j=0}^{N} g_{ij}\right) \times D_{ij}}{\sum_{j=0}^{N} D_{ij}}.$$

$h_{ij}$ represents the overcommitment value that is of the storage resource i on the storage node j and that is in the unit time.

$g_{ij}$ represents the upper limit quantity of I/O requests that can be processed by the storage node j for the storage resource i in the unit time. $\Sigma_{j=0}^{N} g_{ij}$ represents a sum of upper limit quantities of I/O requests that can be processed by N storage nodes for the storage resource i in the unit time. $D_{ij}$ represents the quantity of I/O requests that need to be processed by the storage node j for the storage resource i in the unit time. $\Sigma_{j=0}^{N} D_{ij}$ represents a sum of quantities of I/O requests that need to be processed by the N storage nodes for the storage resource i in the unit time.

The control node allocates the upper limit quantity of tokens that is of the storage resource i on the storage node j and that is in the unit time to the storage resource i according to the following formula:

the upper limit quantity of tokens that is of the storage resource i on the storage node j and that is in the unit time=$h_{ij}+f_{ij}$. fij represents the lower limit quantity of I/O requests that can be processed by the storage node j for the storage resource i in the unit time.

Optionally, $RC_j$ and $D_{ij}$ may be sent by the storage node j to the control node, and the control node may collect the requirement information reported by each storage node and the capability of each storage node.

Optionally, the method for assuring quality of service in the distributed storage system further includes the following steps S406 and S407.

S406: If lower limit quantities of tokens of all the storage resources on the target storage node each are equal to 0, the target storage node obtains a second I/O request in the I/O request queue.

S407: If the second I/O request has the upper limit token, the target storage node processes the second I/O request, where the upper limit quantity of tokens is received by the target storage node from the control node.

The first I/O request and the second I/O request may be requirements of two different storage resources for the target storage node. For example, the first I/O request is a request of the storage resource 1 for a storage node 1, and the second I/O request is a request of a storage resource 2 for the storage node 1. Alternatively, the first I/O request and the second I/O request may be requirements of a same storage resource for the target storage node.

For example, after obtaining the lower limit quantity of tokens and the upper limit quantity of tokens that are of the storage resource from the control node, the target storage node performs the following I/O scheduling process according to a round-robin mechanism:

1. Direct a next pointer towards a queue and start to perform traversal, and if an I/O request having the lower limit token is found from the queue, dequeue the request, and execute the I/O request; if no I/O request meeting the requirement is found, go to step 3.

2. After the I/O request is dequeued, if the I/O request is a request that needs to be processed by the storage node j for the storage resource i, subtract a lower limit quantity of tokens of the storage resource i on the storage node j by 1, direct the next pointer towards a next I/O request in the queue, and go to step 1 until all I/O requests in the queue do not have the lower limit token.

3. Direct the next pointer towards the queue according to a round-robin mechanism and start to perform traversal, and if an I/O request having an upper limit token is found from the queue, dequeue the request, and execute the I/O request; if no I/O request meeting the requirement is found, go to step 5.

4. After the I/O request is dequeued, if the I/O request is a request that needs to be processed by the storage node j for the storage resource i, subtract an upper limit quantity of tokens of the storage resource i on the storage node j by 1, direct the next pointer towards a next I/O request in the queue, and go to step 1 until all I/O requests in the queue do not have the upper limit token.

5. End.

In this traversal manner, the lower assurance limit requirement may be preferentially met, and the upper flow control limit is implemented based on the upper limit token bucket when the lower assurance limit requirement is met.

In this embodiment of the present disclosure, token allocation by the control node may be periodically triggered by a timer, for example, allocation is performed once in 5 s. In other words, the control node periodically generates a token and delivers the token to each storage node. The control node may control a token generation speed, to achieve a QoS goal of each storage resource. For example, the control node generates 1000 tokens for the storage resource 1 per second, sends 300 tokens to the storage node 1, sends 300 tokens to the storage node 2, and sends the remaining 400 tokens to the storage node 3. After receiving the tokens allocated by the control node for the storage resource, each storage node performs the I/O scheduling process according to the foregoing round-robin mechanism.

In addition, the control node may further configure the token generation speed (for example, generate a plurality of lower limit tokens per second or generate a plurality of upper limit tokens per second), and then each storage node is responsible for generating corresponding lower limit tokens or upper limit tokens based on the generation speed configured by the control node. For example, the control node indicates the storage node 1 to generate 300 lower limit tokens and 100 upper limit tokens for the storage resource 1 per second, and the control node indicates the storage node 2 to generate 300 lower limit tokens and 100 upper limit tokens for the storage resource 1 per second, and the control node indicates the storage node 3 to generate 400 lower limit tokens and 100 upper limit tokens for the storage resource 1 per second. In this case, the storage node 1 generates the lower limit tokens for the storage resource 1 at a speed of 300 tokens per second, generates the upper limit tokens for the storage resource 1 at a speed of 100 tokens per second, and performs the I/O scheduling process according to the foregoing round-robin mechanism. The storage node 2 generates the lower limit tokens for the storage resource 1 at a speed of 300 tokens per second, generates the upper limit tokens for the storage resource 1 at a speed of 100 tokens per second, and performs the I/O scheduling process according to the foregoing round-robin mechanism. The storage node 3 generates the lower limit tokens for the storage resource 1 at a speed of 400 tokens per second, generates the upper limit tokens for the storage resource 1 at a speed of 100 tokens per second, and performs the I/O scheduling process according to the foregoing round-robin mechanism.

According to this embodiment of the present disclosure, the control node may allocate tokens of the storage resource to each storage node. Therefore, the storage node only needs to correspondingly schedule and process, based on the tokens allocated by the control node, the I/O request having the token, and the storage node temporarily does not process the I/O request having no token. In the distributed storage system, the lower assurance limit performance is implemented. Further, an upper limit flow control mechanism of the storage resource may be further introduced into the distributed storage system. Different from an operation in which information about a quantity of requests processed by another node needs to be obtained for tag calculation of each request, in this embodiment of the present disclosure, when the quantity of tokens of the storage resource on the target storage node is calculated, only the capability of the target storage node and the requirement of the storage resource on the target storage node need to be considered, and the capabilities of other storage nodes do not need to be considered. Therefore, network communication overheads can be reduced. In addition, in this embodiment of the present disclosure, token update may be periodically implemented, for example, update is performed every 5 s. When scheduling an I/O request, the storage node in this embodiment of the present disclosure does not need to sort request tag values of each I/O request. This reduces calculation overheads of sorting.

Figure 6:
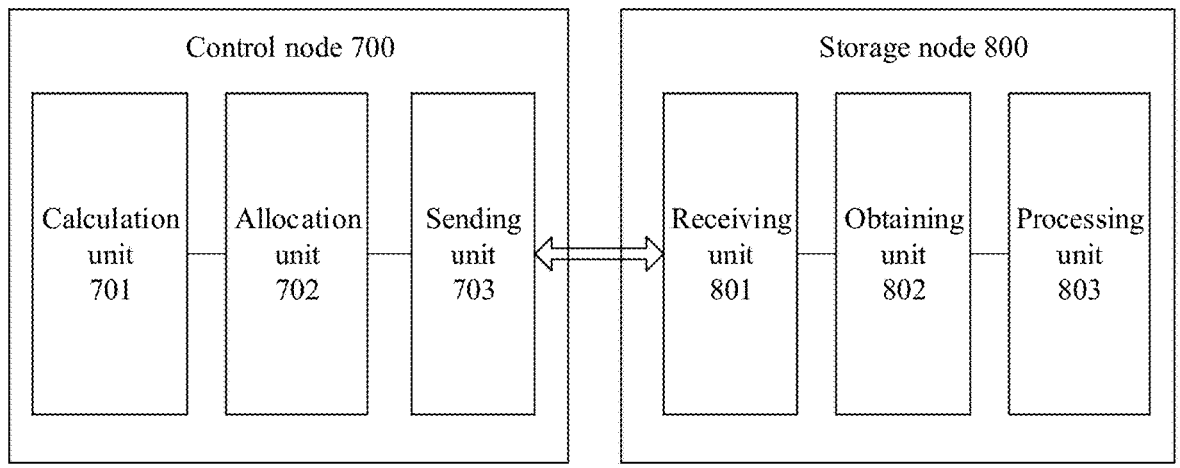
FIG. 6 is a structural block diagram of a distributed storage system, a control node, and a storage node according to an embodiment of the present disclosure.

FIG. 6 is a structural block diagram of a distributed storage system, a control node, and a storage node according to an embodiment of the present disclosure. A distributed storage system 600 includes a control node 700 and a storage node 800. The control node 700 may be the control node 103 in the embodiment in FIG. 1. Correspondingly, the storage node 800 may be the storage node 102 in the embodiment in FIG. 1, and the distributed storage system 600 may be the distributed storage system 100 in FIG. 1. Descriptions are separately provided below.

As shown in FIG. 6, the control node 700 may include a calculation unit 701, an allocation unit 702, and a sending unit 703.

The calculation unit 701 is configured to: obtain, based on a quantity of remaining input/output I/O requests of a target storage node in a unit time, a quantity of I/O requests required by a storage resource to reach a lower assurance limit in the unit time, and a quantity of I/O requests that need to be processed by the target storage node for the storage resource in the unit time, a lower limit quantity of I/O requests that can be processed by the target storage node for the storage resource in the unit time, where the distributed storage system includes N storage nodes that provide the storage resource, the target storage node is one of the N storage nodes, and N is a positive integer.

The allocation unit 702 is configured to allocate a lower limit quantity of tokens that is of the storage resource on the target storage node and that is in the unit time to the storage resource based on the lower limit quantity of I/O requests that can be processed by the target storage node for the storage resource in the unit time.

The sending unit 703 is configured to send the lower limit quantity of tokens to the target storage node.

Optionally, the calculation unit 701 is further configured to obtain, based on the quantity of remaining I/O requests of the target storage node in the unit time, a quantity of I/O requests required by the storage resource to reach an upper flow control limit in the unit time, the quantity of I/O requests that need to be processed by the target storage node for the storage resource in the unit time, and the lower limit quantity of I/O requests that can be processed by the target storage node for the storage resource in the unit time, an upper limit quantity of I/O requests that can be processed by the target storage node for the storage resource in the unit time;

The allocation unit 702 is configured to allocate an upper limit quantity of tokens that is of the storage resource on the target storage node and that is in the unit time to the storage resource based on the lower limit quantity of I/O requests that can be processed by the target storage node for the storage resource in the unit time.

The sending unit 703 is further configured to sequentially send the upper limit quantity of tokens to the target storage node.

Optionally, the calculation unit 701 is specifically configured to:

calculate, based on a maximum flow algorithm, the quantity of remaining input/output I/O requests of the target storage node in the unit time, the quantity of I/O requests required by the storage resource to reach the lower assurance limit in the unit time, and the quantity of I/O requests that need to be processed by the target storage node in the unit time, the lower limit quantity of I/O requests that can be processed by the target storage node for the storage resource in the unit time.

Optionally, the calculation unit 701 is specifically configured to:

calculate a first value, where the first value is a difference between a second value and a third value, the second value is the quantity of I/O requests required by the storage resource to reach the upper flow control limit in the unit time, and the third value is a sum of lower limit quantities of I/O requests that can be processed by the N storage nodes for the storage resource in the unit time;

calculate a fourth value, where the fourth value is a difference between a fifth value and the third value, and the fifth value is the quantity of remaining I/O requests of the target storage node in the unit time;

calculate a sixth value, where the sixth value is a difference between a seventh value and the third value, and the seventh value is a quantity of I/O requests that need to be processed by the target storage node for the storage resource in the unit time; and calculate, based on the first value, the fourth value, and the sixth value, the upper limit quantity of I/O requests that can be processed by the target storage node for the storage resource in the unit time.

Optionally, the allocation unit 702 is specifically configured to:

allocate an overcommitment value that is of the storage resource on the target storage node and that is in the unit time to the storage resource according to the following formula: the overcommitment value that is of the storage resource on the target storage node and that is in the $$\text{unit time} = \text{an eigth value} + \frac{(\text{the second value} - \text{ninth value}) \times \text{the seventh value}}{\text{a tenth value}},$$

where the eighth value is the upper limit quantity of I/O requests that can be processed by the target storage node for the storage resource in the unit time, the ninth value is a sum of upper limit quantities of I/O requests that can be processed by the N storage nodes for the storage resource in the unit time, and the tenth parameter is a sum of quantities of I/O requests that need to be processed by the N storage nodes for the storage resource in the unit time; and "−" represents a subtraction operation, in other words, a difference between the second value and the ninth value, and "x" represents a multiplication operation; and allocate the upper limit quantity of tokens that is of the storage resource on the target storage node and that is in the unit time to the storage resource according to the following formula:

the upper limit quantity of tokens that is of the storage resource on the target storage node and that is in the unit time is a sum of the overcommitment value that is of the storage resource on the target storage node and that is in the unit time and the lower limit quantity of tokens that is of the storage resource on the target storage node and that is in the unit time.

Optionally, the calculation unit 701 is specifically configured to:

calculate, based on a maximum flow algorithm, the first value, the fourth value, and the sixth value, the upper limit quantity of I/O requests that can be processed by the target storage node for the storage resource in the unit time.

Optionally, the control node 700 further includes:

a receiving unit, configured to receive, from the target storage node, the quantity of remaining I/O requests of the target storage node in the unit time and the quantity of I/O requests that need to be processed by the target storage node for the storage resource in the unit time.

For specific implementation of the functional units included in the control node 700, refer to the foregoing embodiment. Details are not described herein again.

As shown in FIG. 6, a storage node 800 may include a receiving unit 801, an obtaining unit 802, and a processing unit 803.

The receiving unit 801 is configured to receive, from a control node, a lower limit quantity of tokens that is of a first storage resource on the storage node and that is in a unit time.

The obtaining unit 802 is configured to obtain a first I/O request in an I/O request queue, where the first I/O request is an I/O request that needs to be processed by the storage node for the first storage resource.

The processing unit 803 is configured to process the first I/O request if the lower limit quantity of tokens of the first storage resource on the storage node is greater than 0.

Optionally, the obtaining unit 802 is further configured to obtain a second I/O request in the I/O request queue if the lower limit quantity of tokens of the first storage resource on the storage node and a lower limit quantity of tokens of a storage resource other than the first storage resource on the storage node are equal to 0, where the second I/O request is an I/O request that needs to be processed by the storage node for the second storage resource.

The processing unit 803 is further configured to process the second I/O request if an upper limit quantity of tokens of the second storage resource on the storage node is greater than 0, where the upper limit quantity of tokens is received by the storage node from the control node.

Optionally, the storage node 800 further includes:

a sending unit, configured to: before the receiving unit 801 receives, from the control node, the lower limit quantity of tokens that is of the first storage resource on the storage node and that is in the unit time, send, to the control node, a quantity of remaining I/O requests of the storage node in the unit time and a quantity of I/O requests that need to be processed by the storage node for the first storage resource in the unit time, where the quantity of remaining I/O requests of the storage node in the unit time and the quantity of I/O requests that need to be processed by the storage node for the first storage resource in the unit time are used by the control node to allocate a quantity of tokens that is of the first storage resource on the storage node and that is in the unit time to the first storage resource.

For specific implementation of functional units included in the storage node 800, refer to the foregoing embodiment. Details are not described herein again.

For specific implementation of the units in the control node 700 and the storage node 800 shown in FIG. 6, refer to the description in FIG. 3. The units may be software modules or hardware. This is not limited in this embodiment of the present disclosure.

In another embodiment of the present disclosure, a readable storage medium is further provided. The readable storage medium stores a computer execution instruction, and when a device (which may be a single-chip microcomputer, a chip, or the like) or a processor may invoke the computer executable instruction stored in the readable storage medium to perform the steps of the control node or the storage node in the method for assuring quality of service in the distributed storage system provided in FIG. 4A and FIG. 4B. The foregoing readable storage medium may include: any medium that can store program code, such as a USB flash drive, a removable hard disk, a read-only memory, a random access memory, a magnetic disk, or an optical disc.

In another embodiment of the present disclosure, a computer program product is further provided. The computer program product includes a computer executable instruction, and the computer executable instruction is stored in a computer-readable storage medium. At least one processor of the device may read the computer executable instruction from the computer-readable storage medium, and the at least one processor executes the computer executable instruction, so that the device implements the steps of the control node or the storage node in the method for assuring quality of service in the distributed storage system provided in FIG. 4A and FIG. 4B.

In another embodiment of the present disclosure, a distributed storage node is further provided, including a control node and a storage node. The control node may be the control node provided in FIG. 6, and is configured to perform the steps of the control node in the method for assuring quality of service in the distributed storage system provided in FIG. 4A and FIG. 4B; and/or the storage node may be the storage node provided in FIG. 6, and is configured to perform the steps of the storage node in the method for assuring quality of service in the distributed storage system provided in FIG. 4A and FIG. 4B.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, a solid-state drive (SSD)), or the like.

What is claimed is:

1. A method for assuring quality of service in a storage system, comprising:
   obtaining, by a control node based on a quantity of remaining input/output (I/O) requests of a target storage node in a unit time, a quantity of I/O requests required by a storage resource to reach a lower assurance limit in the unit time, and a quantity of I/O requests that need to be processed by the target storage node for the storage resource in the unit time, a lower limit quantity of I/O requests that can be processed by the target storage node for the storage resource in the unit time, wherein the storage system comprises N storage nodes that provide the storage resource, the target storage node is one of the N storage nodes, and N is a positive integer;
   allocating, by the control node, a lower limit quantity of tokens that is of the storage resource on the target storage node and that is in the unit time to the storage resource based on the lower limit quantity of I/O requests that can be processed by the target storage node for the storage resource in the unit time; and
   sending, by the control node, the lower limit quantity of tokens to the target storage node.

2. The method according to claim 1, further comprising:
   obtaining, by the control node based on the quantity of remaining I/O requests of the target storage node in the unit time, a quantity of I/O requests required by the storage resource to reach an upper flow control limit in the unit time, the quantity of I/O requests that need to be processed by the target storage node for the storage resource in the unit time, and the lower limit quantity of I/O requests that can be processed by the target storage node for the storage resource in the unit time, an upper limit quantity of I/O requests that can be processed by the target storage node for the storage resource in the unit time;
   allocating, by the control node, an upper limit quantity of tokens that is of the storage resource on the target storage node and that is in the unit time to the storage resource based on the upper limit quantity of I/O requests that can be processed by the target storage node for the storage resource in the unit time; and
   sequentially sending, by the control node, the upper limit quantity of tokens to the target storage node.

3. The method according to claim 1, further comprising:
   calculating, by the control node based on a maximum flow algorithm, the quantity of remaining input/output I/O requests of the target storage node in the unit time, the quantity of I/O requests required by the storage resource to reach the lower assurance limit in the unit time, and the quantity of I/O requests that need to be processed by the target storage node for the storage resource in the unit time, the lower limit quantity of I/O requests that can be processed by the target storage node for the storage resource in the unit time.

4. The method according to claim 2, further comprising:
calculating, by the control node, a first value, wherein the first value is a difference between a second value and a third value, the second value is the quantity of I/O requests required by the storage resource to reach the upper flow control limit in the unit time, and the third value is a sum of lower limit quantities of I/O requests that can be processed by the N storage nodes for the storage resource in the unit time;
calculating, by the control node, a fourth value, wherein the fourth value is a difference between a fifth value and the third value, and the fifth value is the quantity of remaining I/O requests of the target storage node in the unit time;
calculating, by the control node, a sixth value, wherein the sixth value is a difference between a seventh value and the third value, and the seventh value is the quantity of I/O requests that need to be processed by the target storage node for the storage resource in the unit time; and
obtaining, by the control node based on the first value, the fourth value, and the sixth value, the upper limit quantity of I/O requests that can be processed by the target storage node for the storage resource in the unit time.

5. The method according to claim 4, further comprising:
allocating, by the control node, an overcommitment value that is of the storage resource on the target storage node and that is in the unit time to the storage resource according to the following formula:
the overcommitment value that is of the storage resource on the target storage node and that is in the $$\text{unit time} = \text{an eigth value} + \frac{(\text{the second value} - \text{a ninth value}) \times \text{the seventh value}}{\text{a tenth value}},$$

wherein the eighth value is the upper limit quantity of I/O requests that can be processed by the target storage node for the storage resource in the unit time, the ninth value is a sum of upper limit quantities of I/O requests that can be processed by the N storage nodes for the storage resource in the unit time, and the tenth value is a sum of quantities of I/O requests that need to be processed by the N storage nodes for the storage resource in the unit time; and
allocating, by the control node, the upper limit quantity of tokens that is of the storage resource on the target storage node and that is in the unit time to the storage resource, wherein the upper limit quantity of tokens that is of the storage resource on the target storage node and that is in the unit time is a sum of the overcommitment value that is of the storage resource on the target storage node and that is in the unit time and the lower limit quantity of tokens that is of the storage resource on the target storage node and that is in the unit time.

6. The method according to claim 4, further comprising:
calculating, by the control node based on a maximum flow algorithm, the first value, the fourth value, and the sixth value, the upper limit quantity of I/O requests that can be processed by the target storage node for the storage resource in the unit time.

7. The method according to claim 1, further comprising:
receiving, by the control node from the target storage node, the quantity of remaining I/O requests of the target storage node in the unit time and the quantity of I/O requests that need to be processed by the target storage node for the storage resource in the unit time.

8. A control node, comprising:
an interface; and
a processor coupled to the interface and configured to:
obtain, based on a quantity of remaining input/output (I/O) requests of a target storage node in a unit time, a quantity of I/O requests required by a storage resource to reach a lower assurance limit in the unit time, and a quantity of I/O requests that need to be processed by the target storage node in the unit time, a lower limit quantity of I/O requests that can be processed by the target storage node for the storage resource in the unit time, wherein the target storage node is one of N storage nodes that provide the storage resource in a storage system, N is a positive integer;
allocate a lower limit quantity of tokens that is of the storage resource on the target storage node and that is in the unit time to the storage resource based on the lower limit quantity of I/O requests that can be processed by the target storage node for the storage resource in the unit time; and
send the lower limit quantity of tokens to the target storage node.

9. The control node according to claim 8, wherein the processor is further configured to:
obtain, based on the quantity of remaining I/O requests of the target storage node in the unit time, a quantity of I/O requests required by the storage resource to reach an upper flow control limit in the unit time, the quantity of I/O requests that need to be processed by the target storage node for the storage resource in the unit time, and the lower limit quantity of I/O requests that can be processed by the target storage node for the storage resource in the unit time, an upper limit quantity of I/O requests that can be processed by the target storage node for the storage resource in the unit time;
allocate an upper limit quantity of tokens that is of the storage resource on the target storage node and that is in the unit time to the storage resource based on the upper limit quantity of I/O requests that can be processed by the target storage node for the storage resource in the unit time; and
sequentially send the upper limit quantity of tokens to the target storage node.

10. The control node according to claim 8, wherein the processor is further configured to:
calculate, based on a maximum flow algorithm, the quantity of remaining input/output I/O requests of the target storage node in the unit time, the quantity of I/O requests required by the storage resource to reach the lower assurance limit in the unit time, and the quantity of I/O requests that need to be processed by the target storage node for the storage resource in the unit time, the lower limit quantity of I/O requests that can be processed by the target storage node for the storage resource in the unit time.

11. The control node according to claim 9, wherein the processor is further configured to:
calculate a first value, a fourth value, and a sixth value, and obtain, based on the first value, the fourth value, and the sixth value, the upper limit quantity of I/O requests that can be processed by the target storage node for the storage resource in the unit time, wherein the first value is a difference between a second value and a third value, the second value is the quantity of I/O requests required by the storage resource to reach the upper flow control limit in the unit time, and the third value is a sum of lower limit quantities of I/O requests that can be processed by the N storage nodes for the storage resource in the unit time; the fourth value is a difference between a fifth value and the third value, and the fifth value is the quantity of remaining I/O requests of the target storage node in the unit time; and the sixth value is a difference between a seventh value and the third value, and the seventh value is the quantity of I/O requests that need to be processed by the target storage node for the storage resource in the unit time.

12. The control node according to claim 11, wherein the processor is further configured to:
allocate an overcommitment value that is of the storage resource on the target storage node and that is in the unit time to the storage resource according to the following formula:
the overcommitment value that is of the storage resource on the target storage node and that is in the unit time =
$$\text{an eigth value} + \frac{(\text{the second value} - \text{a ninth value}) \times \text{the seventh value}}{\text{a tenth value}},$$

wherein the eighth value is the upper limit quantity of I/O requests that can be processed by the target storage node for the storage resource in the unit time, the ninth value is a sum of upper limit quantities of I/O requests that can be processed by the N storage nodes for the storage resource in the unit time, and the tenth value is a sum of quantities of I/O requests that need to be processed by the N storage nodes for the storage resource in the unit time; and
allocate the upper limit quantity of tokens that is of the storage resource on the target storage node and that is in the unit time to the storage resource, wherein the upper limit quantity of tokens that is of the storage resource on the target storage node and that is in the unit time is a sum of the overcommitment value that is of the storage resource on the target storage node and that is in the unit time and the lower limit quantity of tokens that is of the storage resource on the target storage node and that is in the unit time.

13. The control node according to claim 11, wherein the processor is further configured to:
calculate, based on a maximum flow algorithm, the first value, the fourth value, and the sixth value, the upper limit quantity of I/O requests that can be processed by the target storage node for the storage resource in the unit time.

14. The control node according to claim 8, wherein the processor is further configured to receive, from the target storage node, the quantity of remaining I/O requests of the target storage node in the unit time and the quantity of I/O requests that need to be processed by the target storage node for the storage resource in the unit time.

15. A storage system, comprising a control node and N storage nodes, wherein the control node is configured to:
obtain, based on a quantity of remaining input/output (I/O) requests of a target storage node in a unit time, a quantity of I/O requests required by a storage resource to reach a lower assurance limit in the unit time, and a quantity of I/O requests that need to be processed by the target storage node in the unit time, a lower limit quantity of I/O requests that can be processed by the target storage node for the storage resource in the unit time, wherein the target storage node is one of N storage nodes that provide the storage resource in a storage system, N is a positive integer;
allocate a lower limit quantity of tokens that is of the storage resource on the target storage node and that is in the unit time to the storage resource based on the lower limit quantity of I/O requests that can be processed by the target storage node for the storage resource in the unit time; and
send the lower limit quantity of tokens to the target storage node.

16. The storage system according to claim 15, wherein the control node is further configured to:
obtain, based on the quantity of remaining I/O requests of the target storage node in the unit time, a quantity of I/O requests required by the storage resource to reach an upper flow control limit in the unit time, the quantity of I/O requests that need to be processed by the target storage node for the storage resource in the unit time, and the lower limit quantity of I/O requests that can be processed by the target storage node for the storage resource in the unit time, an upper limit quantity of I/O requests that can be processed by the target storage node for the storage resource in the unit time;
allocate an upper limit quantity of tokens that is of the storage resource on the target storage node and that is in the unit time to the storage resource based on the upper limit quantity of I/O requests that can be processed by the target storage node for the storage resource in the unit time; and
sequentially send the upper limit quantity of tokens to the target storage node.

17. The storage system according to claim 15, wherein the control node is further configured to:
calculate, based on a maximum flow algorithm, the quantity of remaining input/output I/O requests of the target storage node in the unit time, the quantity of I/O requests required by the storage resource to reach the lower assurance limit in the unit time, and the quantity of I/O requests that need to be processed by the target storage node for the storage resource in the unit time, the lower limit quantity of I/O requests that can be processed by the target storage node for the storage resource in the unit time.

18. The storage system according to claim 16, wherein the control node is further configured to:
calculate a first value, a fourth value, and a sixth value, and obtain, based on the first value, the fourth value, and the sixth value, the upper limit quantity of I/O requests that can be processed by the target storage node for the storage resource in the unit time, wherein the first value is a difference between a second value and a third value, the second value is the quantity of I/O requests required by the storage resource to reach the upper flow control limit in the unit time, and the third value is a sum of lower limit quantities of I/O requests that can be processed by the N storage nodes for the storage resource in the unit time; the fourth value is a difference between a fifth value and the third value, and the fifth value is the quantity of remaining I/O requests of the target storage node in the unit time; and the sixth value is a difference between a seventh value and the third value, and the seventh value is the quantity of I/O requests that need to be processed by the target storage node for the storage resource in the unit time.

19. The storage system according to claim 18, wherein the control node is further configured to:
  calculate, based on a maximum flow algorithm, the first value, the fourth value, and the sixth value, the upper limit quantity of I/O requests that can be processed by the target storage node for the storage resource in the unit time.

20. The storage system according to claim 15, wherein the control node is further configured to:
  receive, from the target storage node, the quantity of remaining I/O requests of the target storage node in the unit time and the quantity of I/O requests that need to be processed by the target storage node for the storage resource in the unit time.

\* \* \* \* \*

UNITED STATES PATENT AND TRADEMARK OFFICE
CERTIFICATE OF CORRECTION

PATENT NO. : 11,320,998 B2
APPLICATION NO. : 17/175331
DATED : May 3, 2022
INVENTOR(S) : Yu et al.

Page 1 of 1

It is certified that error appears in the above-identified patent and that said Letters Patent is hereby corrected as shown below:

On the Title Page

Assignees (73):
"William Marsh Rice University" should read -- William Marsh Rice University, Houston, TX (US) --.

In the Claims

Claim 5: Column 23, Line 37:
"an eigth value + $\frac{\text{(the second value - a ninth value)} \times \text{the seventh value}}{\text{a tenth value}}$," should read -- an eighth value + $\frac{\text{(the second value - a ninth value)} \times \text{the seventh value}}{\text{a tenth value}}$, --.

Claim 12: Column 25, Line 25:
"an eigth value + $\frac{\text{(the second value - a ninth value)} \times \text{the seventh value}}{\text{a tenth value}}$," should read -- an eighth value + $\frac{\text{(the second value - a ninth value)} \times \text{the seventh value}}{\text{a tenth value}}$, --.

Signed and Sealed this
Twenty-seventh Day of September, 2022

Katherine Kelly Vidal
*Director of the United States Patent and Trademark Office*